(12) United States Patent
Birnbaum et al.

(10) Patent No.: US 9,838,139 B2
(45) Date of Patent: Dec. 5, 2017

(54) COHERENTLY-COMBINED MULTIPLE APERTURES

(71) Applicant: Facebook, Inc., Menlo Park, CA (US)

(72) Inventors: Kevin Michael Birnbaum, Palo Alto, CA (US); Chien-Chung Chen, Thousand Oaks, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/982,491

(22) Filed: Dec. 29, 2015

(65) Prior Publication Data

US 2017/0187467 A1    Jun. 29, 2017

(51) Int. Cl.
| | |
|---|---|
| *H04B 10/61* | (2013.01) |
| *H04B 10/071* | (2013.01) |
| *H04B 10/11* | (2013.01) |
| *H04B 10/112* | (2013.01) |
| *H04B 10/114* | (2013.01) |
| *H04B 10/60* | (2013.01) |

(52) U.S. Cl.
CPC ......... *H04B 10/615* (2013.01); *H04B 10/071* (2013.01); *H04B 10/11* (2013.01); *H04B 10/112* (2013.01); *H04B 10/114* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 4,635,299 A * | 1/1987 | MacGovern | ....... H04B 10/1125 356/153 |
| 6,924,935 B2 | 8/2005 | Miller et al. | |
| 7,239,777 B1 | 7/2007 | Christensen et al. | |
| 7,257,334 B1 * | 8/2007 | Weitzel | .................... G01J 3/453 398/187 |
| 2007/0140695 A1 * | 6/2007 | Suzuki | ............... G02B 6/29349 398/79 |

FOREIGN PATENT DOCUMENTS

EP          2033276 B1     1/2011

* cited by examiner

*Primary Examiner* — Darren E Wolf
(74) *Attorney, Agent, or Firm* — Perkins Coie LLP

(57) ABSTRACT

Optical communication systems and methods using coherently combined optical beams are disclosed. A representative system includes a first mirror having a first actuator for adjusting a position of the first mirror in a path of a first optical beam and a first optical detector for receiving light reflected from the first mirror. The system also includes a second mirror having a second actuator for adjusting a position of the second mirror in a path of a second optical beam and a second optical detector for receiving light reflected from the second mirror. The system includes an interferometer for measuring an interference between the first and second optical beams and a third optical detector for receiving light from the second interfered optical beam. Intensity of the first interfered optical beam is increased by the interference, and intensity of the second interfered optical beam is decreased by the interference.

16 Claims, 4 Drawing Sheets

COHERENTLY-COMBINED MULTIPLE APERTURES

TECHNICAL FIELD

The disclosed embodiments generally relate to the field of optical communication, and more specifically to coherently combining beams of light received from multiple apertures into an input of an optical fiber. Combining coherent beams of light may be advantageous to reduce or eliminate signal fading caused by atmospheric turbulence.

BACKGROUND

Errors in optically transmitted data may be due to different causes, including distortion of the signal in the transmission medium. In free-space optical communications systems that propagate light through air, turbulence can be a significant source of channel impairment. For example, non-uniform refraction of the optical beam can be caused by small-scale fluctuations in air density that result from temperature or pressure gradients along the path of the optical beam. These atmospheric fluctuations can cause frequency-nonselective fades in the optical beam's power. The fade process has a correlation time which is typically much longer than the duration of a typical symbol in the optical beam, therefore negatively impacting the signal to noise ratio of the data stream.

To reduce the beam fading, some conventional technologies use adaptive optics. The adaptive optics correct the deformations of an incoming wavefront of light by measuring the distortions in the wavefront of the optical beam (e.g., using array with hundreds or thousands of detectors) and by compensating these distortions with adaptive optical elements, e.g., deformable mirrors. Typically, hundreds of actuators are needed to appropriately deform a mirror. However, the deformable mirrors and other active optical elements generally have relatively slow response time, therefore not being capable of correcting the fast-changing distortions in the wavefront of the optical beam. Furthermore, the active optical elements can be expensive.

Some other conventional technologies use an optical beam with relatively wide aperture to average-out the intensity variations across the beam, thereby reducing the fading. Generally, the required aperture of a beam that would overcome turbulence-induced fading becomes very large. However, for many practical applications of optical data transmission, the size of the aperture is limited, e.g., due to energy required to generate the beam or the allowable spacing among the beams. Furthermore, aperture-averaging does not correct for phase variations across the aperture, and is thus unsuitable for systems that utilize phase-sensitive signaling or single-spatial mode coupling. Accordingly, there remains a need for optical communication systems that can reliably transfer data through the atmosphere, where the atmosphere causes distortions in the wavefront and/or frequency-nonselective fades in optical power.

DETAILED DESCRIPTION

Figure 1:
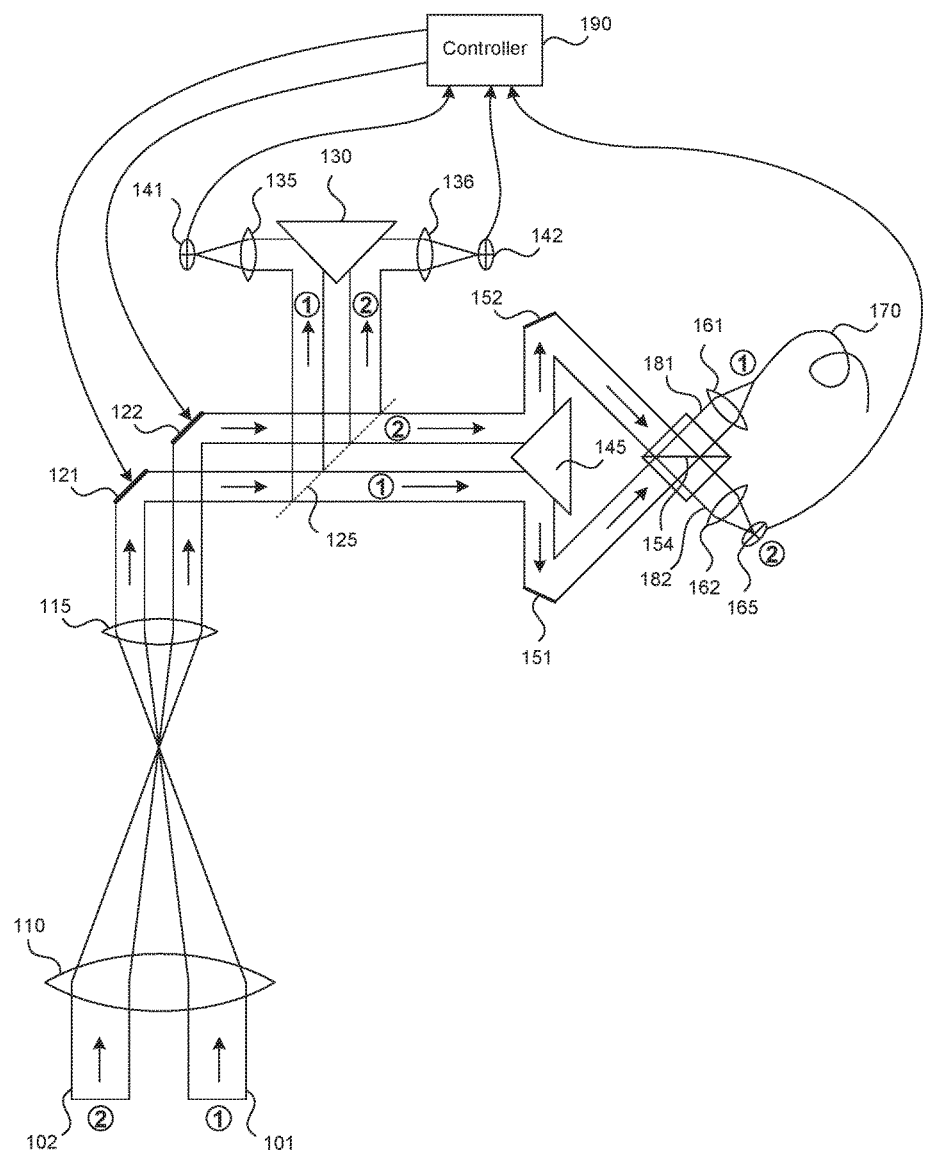
FIG. 1 is a schematic diagram illustrating optical data transmission through the atmosphere in accordance with various embodiments.

Embodiments are directed to coherently combining the light from multiple apertures into an input of an optical fiber. Because the optical beams are coherent, turbulence-induced stochastic variations that cause fading of the individual beams may, in many cases, be reduced or eliminated in a combined optical beam. In some embodiments, combining the coherent optical beams increases gain, and/or reduces scintillation. The combined optical beam may be optically coupled to an optical fiber.

Briefly described, various embodiments use arrangements for coherently combining optical beams that are received from multiple (e.g., two or more) apertures. At least some mirrors in the path of the optical beams are coupled to corresponding mirror actuators that cause the mirrors to move in X, Y or Z directions to adjust tip (rotating about X axis), tilt (rotating about Y axis) and/or piston (translating along Z axis) of the mirrors. These mirrors can be moved to reflect the optical beams in specified directions. In some embodiments, the reflected optical beams impinge on their corresponding detector elements, such as quad detectors, that measure the intensity of the light reflected from the mirrors, and provide the measurements to a controller. As is known in the art, quad detectors can sense various properties of optical beams. The controller produces feedback signals to mirror actuators that adjust the mirrors. Some embodiments include an interferometer section that receives the light reflected from the mirrors. A detector (e.g., a split detector) within the interferometer section may track the error signal of the combined beams, and may provide feedback to the mirror actuators for adjustment of the mirrors. The interference between the two beams may be controlled to maximize or at least increase light intensity of the optical beam that is coupled to an optical fiber, and to minimize or at least decrease light intensity of the other optical beam. For example, the output of the interferometer can include the coherently combined output beam that is coupled to the optical fiber. A detector (e.g., a split detector) within the interferometer section can be used to track the error signal of the coherently combined beams, and provides feedback to the mirror actuators for adjustment of the mirrors.

In some embodiments, widely spaced optical beams are incident on the mirrors (e.g., first mirror reflects first optical beam, second mirror reflecting second optical beam, etc.). The mirrors may be coupled to mirror actuators that cause the mirrors to move in X, Y or Z directions to adjust mirror position (e.g., tip, tilt or piston). The reflected optical beams may be passed through beamsplitters to partially direct the optical beams to their corresponding detector elements, such as quad detectors. The detector elements can measure the intensity/location of the light reflected from the mirrors to provide feedback (e.g., through a controller) to the mirror actuators that adjust the position of the mirrors. In some embodiments, a pixelated sensor (e.g., a CCD array) may collect an image of the combined light after reflecting the optical beams from the first and second mirrors. Unlike conventional technologies that require sensors with hundreds or thousands of pixels, the pixelated sensor in the present embodiments can be relatively small, e.g., 4×4 CCD array or photodiode array. The image obtained by the image sensor can be analyzed to provide feedback to the mirror actuators of the first and second mirrors for further adjustment. The optical beams are coherently combined and coupled to the optical fiber to increase the intensity of the signal and to reduce signal fading.

FIG. 1 is a schematic diagram illustrating optical data transmission through the atmosphere in accordance with various embodiments. In the illustrated embodiment, a first optical beam 101 and a second optical beam 102 are directed through a first lens 110 and a second lens 115 to a first mirror 121 and a second mirror 122, respectively. While the exemplary embodiment of FIG. 1 depicts two optical beams, the disclosed techniques can be extended to additional coherently-combined optical beams having corresponding mirrors. Furthermore, while an illustrative arrangement of lenses and optical reflectors is depicted in FIG. 1, other arrangements are also possible.

The first and second mirrors 121, 122 reflect the first and second optical beams 101, 102 toward a beamsplitter (e.g., a semitransparent mirror or a half-silvered mirror) that directs a portion of the first and second optical beams toward a first optical prism 130. The first optical prism 130 directs the first and second optical beams toward a third lens 135 and a fourth lens 136, respectively. The third and fourth lenses 135, 136 direct the first and second optical beams to a first optical detector 141 and a second optical detector 142, respectively. In some embodiments, the optical detectors may be position-sensitive detectors, such as quad detectors that detect the optical power over each of the quarters (e.g., 90° segments) of the optical detector. The position sensitive detector may also be a detector array or a lateral-effect device. The first and second optical detectors 141, 142 can feed their output signals to a controller 190. The controller 190 may provide control signals to the actuators. In some embodiments, the first and second mirrors 121, 122 may be actuated by their respective actuators that can provide tip, tilt and/or piston adjustment of the mirror position. In some embodiments, the first mirror 121 can be actuated in the tip, tilt and piston directions, while the second mirror 122 can be actuated in the tip and tilt directions. The actuation of the first and second mirrors 121, 122 may improve alignment of the first and second optical beams, as explained below.

In some embodiments, the first and second optical beams 101, 102 may be directed to a second optical prism 145 and further to a third mirror 151 and a fourth mirror 152, respectively. In some embodiments, the third and second mirrors 151, 152 may be attached to the actuators that are controllable by the controller 190. The reflected first and second optical beams 101, 102 intersect and combine interferometrically at a beamsplitter 154. The interference occurs between the first and second optical beams 101, 102 at the same wavelength (or carrier frequency) because of the phase difference between the optical beams. The interferometrically combined first and second optical beams 181, 182 may be directed to a third optical detector 165 and an optical fiber 170, respectively, through a fifth lens 162 and a sixth lens 161. The intensity of the first interferometrically combined optical beam 181 (also referred to as the first interfered optical beam 181) that is coupled to the optical fiber 170 may be maximized or at least increased by minimizing or at least decreasing the intensity of the second interferometrically combined optical beam 182 (also referred to as the second interfered optical beam 182) directed to the optical detector 165. For example, the optical detector 165 can provide an input to the controller 190 for additional adjustment of the mirror at the mirror 121. The additional piston actuation of the mirror 121 can increase the intensity of the first interferometrically combined optical beam 181 (therefore increasing the intensity of light in the optical fiber), while in turn decreasing the intensity of the second interferometrically combined optical beam 182 at the optical detector 165. In some embodiments, the optical detector 165 can be a position-sensitive detector such as the quad detector that is described in more detail with reference to FIG. 2 below. In some embodiments the optical detector 165 can be a detector array or a lateral-effect device.

Figure 2:
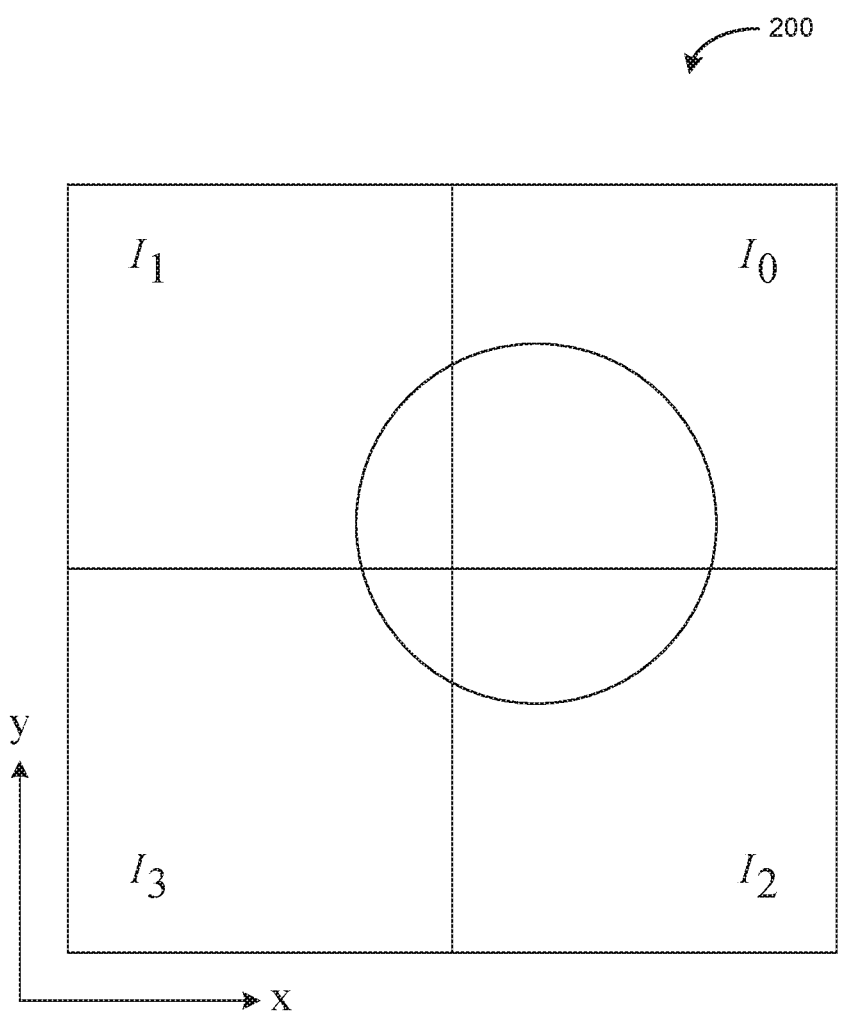
FIG. 2 is a schematic diagram illustrating a quad detector in accordance with various embodiments.

FIG. 2 is a schematic diagram illustrating a quad detector in accordance with various embodiments. The illustrated quad detector 200 includes four quadrants $I_0$ to $I_3$ that can detect intensity of light. For example, in the illustrated example, quadrant $I_0$, having higher illumination than the other three quadrants, can detect light and provide high output, while the quadrants $I_1$, $I_2$ and $I_3$ can provide relatively low output. In the illustrated arrangement, the quadrants are arranged in an X-Y orthogonal coordinate system, however, other arrangements are also possible.

Figure 3A:
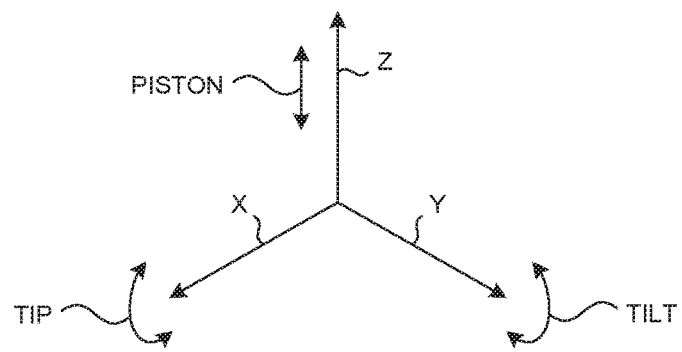
FIGS. 3A-3D are schematic diagrams illustrating a mirror actuator in accordance with various embodiments.
Figure 3B:
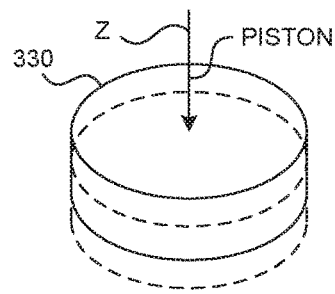
Figure 3C:
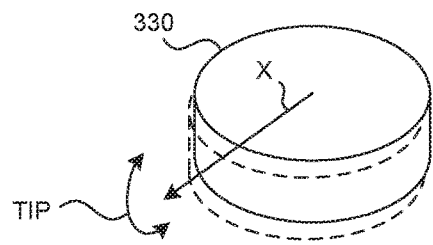
Figure 3D:
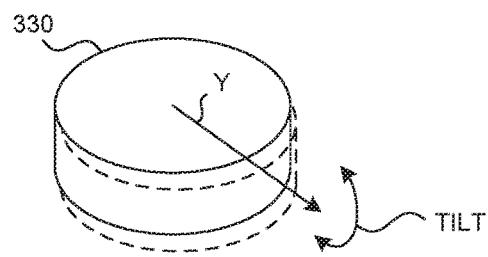

FIGS. 3A-3D are schematic diagrams illustrating a mirror actuator in accordance with various embodiments. FIG. 3A illustrates the three directions of actuation: tip—rotation about the x axis, tilt—rotation about the y axis, and piston—translation along the z axis. FIGS. 3B-3D illustrate details of the actuation caused by the exemplary actuator. In some embodiments, a mirror may be attached to a surface 330 of the mirror actuator. The movements of the surface 330 (e.g., in response to control signal from the controller) can reposition the attached mirror to improve direction of the optical beam that reflects from the mirror. In some embodiments, several movements of the surface 330, and consequently of the attached mirror, can be executed in response to a control signal from the controller.

In some embodiments, the control signals can be based on the following analysis. For example, the two optical fields $u_0$ and $u_1$ may combine interferometrically as:

$$u_0 = A_0 \exp[i(a_0 x + b_0 y + c_0)]$$

$$u_1 = A_1 \exp[i(a_1 x + b_1 y + c_1)]$$

where $A_0$ and $A_1$ are uniform amplitudes of the optical beams (e.g., the first optical beam 101 and the second optical beam 102). The optical beams can be summed as:

$$u = u_0 + u_1$$

with resulting intensity $$I = |u|^2$$

for the following range:

$$-L \leq x \leq L, \quad -L \leq y \leq L$$

Therefore, the intensity of the interferometrically combined beam is:

$$I(x, y) = A_0^2 + A_1^2 + A_0 A_1 2 \cos[ax + by + c]$$

$$a \equiv a_0 - a_1$$

$$b \equiv b_0 - b_1$$

$$c \equiv c_0 - c_1$$

If the angle inside the cosine is close to $\pi$, a Taylor expansion approximates intensity as:

$$I(x, y) \approx A_0^2 + A_1^2 - 2A_0 A_1 + 2A_0 A_1 \frac{1}{2}(ax + by + c)^2$$

$$= A_0^2 + A_1^2 - 2A_0 A_1 + A_0 A_1 (a^2 x^2 + b^2 y^2 + c^2 + 2axby + 2axc + 2byc)$$

For a square quadrant detector illustrated in FIG. 1, the quadrant "0" would detect:

$$Q_0 = \int_{x=0}^{L} \int_{y=0}^{L} I(x,y) dy dx$$
$$= \iint A_0^2 + A_1^2 - 2A_0 A_1 + A_0 A_1$$
$$(a^2 x^2 + b^2 y^2 + c^2 + 2axc + 2byc + 2axby)$$
$$= L^2 (A_0^2 + A_1^2 - 2A_0 A_1) + A_0 A_1$$
$$\left(\frac{1}{3} a^2 L^3 + \frac{1}{3} b^2 L^3 + acL^2 + bcL^2 + \frac{1}{2} abL^4 + c^2 L^2\right)$$

Similarly, quadrant "1" detects:

$$Q_1 = \int_{x=-L}^{0} \int_{y=0}^{L} I(x,y) dy dx$$

$$Q_1 = L^2(A_0^2 + A_1^2 - 2A_0 A_1) + A_0 A_1(\tfrac{1}{3}a^2 L^3 + \tfrac{1}{3}b^2 L^3 - acL^2 + bcL^2 - \tfrac{1}{2}abL^4 + c^2 L^2)$$

The intensity over remaining quadrants can be calculated as:

$$Q_2 = L^2(A_0^2 + A_1^2 - 2A_0 A_1) + A_0 A_1(\tfrac{1}{3}a^2 L^3 + \tfrac{1}{3}b^2 L^3 + acL^2 - bcL^2 - \tfrac{1}{2}abL^4 + c^2 L^2)$$

$$Q_3 = L^2(A_0^2 + A_1^2 - 2A_0 A_1) + A_0 A_1(\tfrac{1}{3}a^2 L^3 + \tfrac{1}{3}b^2 L^3 - acL^2 - bcL^2 + \tfrac{1}{2}abL^4 + c^2 L^2)$$

Thus we can define quantities $$V \equiv (Q_0 + Q_1) - (Q_2 + Q_3) = 4A_0 A_1 bcL^2$$
$$H \equiv (Q_0 + Q_2) - (Q_1 + Q_3) = 4A_0 A_1 acL^2$$
$$D \equiv (Q_0 + Q_3) - (Q_1 + Q_2) = 2A_0 A_1 abL^4$$
$$S \equiv Q_0 + Q_1 + Q_2 + Q_3 = 4L^2(A_0^2 + A_1^2 - 2A_0 A_1) + \tfrac{4}{3} A_0 A_1 L^3 (a^2 + b^2) + 4A_0 A_1 c^2 L^2$$

and produce the resulting estimators which are proportional to the errors:

$$E_{piston} = \frac{V \cdot H}{D} = \frac{16 A_0^2 A_1^2 L^4 abc^2}{2 A_0 A_1 L^4 ab} = 8 A_0 A_1 c^2$$

$$E_{tip} = \frac{V \cdot D}{H} = \frac{8 A_0^2 A_1^2 L^6 ab^2 c}{4 A_0 A_1 L^2 ac} = 2 A_0 A_1 L^4 b^2$$

$$E_{tilt} = \frac{H \cdot D}{V} = \frac{8 A_0^2 A_1^2 L^6 a^2 bc}{4 A_0 A_1 L^2 bc} = 2 A_0 A_1 L^4 a^2$$

Because L is a known quantity (the size of the quadrant), and $A_0$, $A_1$ can be measured because they are related to power in each arm of the interferometer, then a (tilt), b (tip) and c (piston) can be controlled to be small, but non-zero, through feedback to piston to control c, feedback to horizontal tilt to control a, and feedback to vertical tip to control b.

Figure 4:
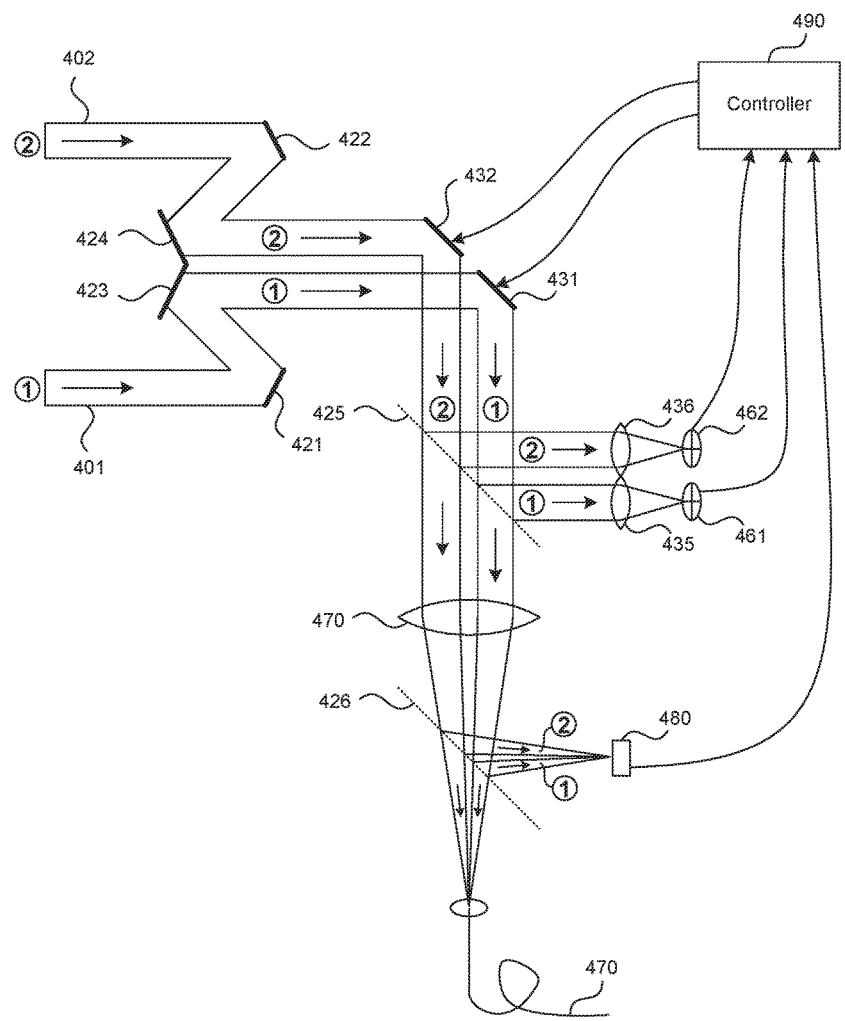
FIG. 4 is a schematic diagram illustrating optical data transmission through the atmosphere in accordance with various embodiments.

FIG. 4 is a schematic diagram illustrating optical data transmission through the atmosphere in accordance with various embodiments. The illustrated embodiment may be suitable for the optical beams that are widely spaced apart (e.g., the apertures are widely spaced apart). While the exemplary embodiment of FIG. 4 depicts two optical beams, the disclosed techniques can be extended to include additional coherent optical beams. In some embodiments, a first optical beam 401 reflects from a first mirror 421, a third mirror 423 and a fifth mirror 431, and a second optical beam 402 reflects from a second mirror 422, a fourth mirror 424 and a sixth mirror 432. The fifth mirror 431 and the sixth mirror 432 direct the first and second optical beams 401, 402, respectively, toward a first beamsplitter 425 (e.g., a semitransparent mirror or a half-silvered mirror). The first beamsplitter 425 can direct a portion of the first and second optical beams 401, 402, respectively, toward a first lens 435 and a second lens 436, and further toward a first optical detector 461 and a second optical detector 462. In some embodiments, the optical detectors 461, 462 can be quad detectors as illustrated in FIG. 2. In some embodiments, the optical detectors 461, 462 feed their outputs to a controller 490. Based at least in part on the signals received from the optical detectors 461, 462, the controller 490 can adjust position of the fifth mirror 431 and the sixth mirror 432 such that the coherent coupling of the first and second beam at an optical fiber 470 is improved. The fifth and sixth mirrors 431, 432 can be attached to the actuators that adjust tip, tilt and piston of the mirrors. In some embodiments, the fifth mirror 431 can be attached to the actuators that adjust tip and piston, and the sixth mirror 432 can be attached to the actuators that adjust tip, tilt and piston. In some embodiments, the actuators illustrated in FIGS. 3A-3D can be used.

In some embodiments, the first and second optical beams 401, 402 are directed to a third lens 470 and further to a second beamsplitter 426. The second beamsplitter 426 may direct at least a portion of the first optical beam 401 and the second optical beam 402 to a pixelated sensor 480. In some embodiments, the pixelated sensor 480 may have relatively low resolution, e.g., 4×4 pixels. Signal from the pixelated sensor 480 can be fed to the controller 490 for additional positional adjustment of the fifth mirror 431 and the sixth mirror 432. In some embodiments, the signal from the pixelated sensor can be used to adjust piston of the fifth and sixth mirrors 431, 432, thereby improving optical coupling of the first and second optical beams 401, 402 and increasing intensity of the combined optical beam in the optical fiber 470.

The embodiment illustrated in FIG. 4 includes two optical beams, but a number of other optical beams can also be combined. For example, combining four optical beams can be described as:

$$u = \sum_{j=0}^{3} u_j$$

where u is non-zero on one quadrant of a quad detector, and the individual optical beams are:

$$u_j = A_j \exp[i(a_j x + b_j y + c_j)]$$

For a domain that is a box of size L×L centered at $$\left(\pm \frac{L}{2}, \pm \frac{L}{2}\right),$$

four adjacent squares each with uniform intensity can be added. Each square may have different intensity, phase, tip, and tilt. The optical beams are combinable through Fourier transform in focal plane as:

$$\tilde{u} = A_0 \exp\left[ic_0 - i\frac{a_0 L}{2} - i\frac{b_0 L}{2}\right] \exp[-i\pi L x' -$$
$$i\pi L y'] \mathrm{sinc}\left[\pi L x' + \frac{a_0 L}{2}\right] \mathrm{sinc}\left[\pi L y' + \frac{b_0 L}{2}\right] +$$

-continued $$A_1 \exp\left[ic_1 + i\frac{a_1L}{2} - i\frac{b_1L}{2}\right]\exp[i\pi Lx' -$$

$$i\pi Ly']\text{sinc}\left[\pi Lx' + \frac{a_1L}{2}\right]\text{sinc}\left[\pi Ly' + \frac{b_1L}{2}\right] +$$

$$A_2 \exp\left[ic_2 - i\frac{a_2L}{2} + i\frac{b_2L}{2}\right]\exp[-i\pi Lx' +$$

$$i\pi Ly']\text{sinc}\left[\pi Lx' + \frac{a_2L}{2}\right]\text{sinc}\left[\pi Ly' + \frac{b_2L}{2}\right] +$$

$$A_3 \exp\left[ic_3 + i\frac{a_3L}{2} + i\frac{b_3L}{2}\right]\exp[i\pi Lx' +$$

$$i\pi Ly']\text{sinc}\left[\pi Lx' + \frac{a_3L}{2}\right]\text{sinc}\left[\pi Ly' + \frac{b_3L}{2}\right]$$

Therefore, the intensity of the optical beam is:

$$I(x', y') = |\tilde{u}|^2$$

If the tip and tilt terms have been zeroed-out for each optical beam, then the following is true for the combination of the four optical beams:

$$a_0 = a_1 = a_2 = a_3 = b_0 = b_1 = b_2 = b_3 = 0$$

$$\tilde{u} = \sin c[\pi Lx'] \sin c[\pi Ly']\{A_0 \exp(ic_0)\exp(-i\pi Lx' - i\pi Ly') + A_1 \exp(ic_1)\exp(i\pi Lx' - i\pi Ly') + A_2 \exp(ic_2)\exp(-i\pi Lx' + i\pi Ly') + A_3 \exp(ic_3)\exp(i\pi Lx' + i\pi Ly')\}$$

From the foregoing, it will be appreciated that specific embodiments of the invention have been described herein for purposes of illustration, but that various modifications may be made without deviating from the scope of the invention. For example, in some embodiments the optical beams may propagate through a vacuum, or a combination of air and vacuum. In some embodiments, the optical beams may have frequency that is not visible, for example, frequency higher than that of the visible light. Accordingly, the invention is not limited, except as by the appended claims.

The invention claimed is:

1. An optical communication system for coherently combining optical beams, comprising:
   a first mirror having a first actuator for adjusting a position of the first mirror in a path of a first optical beam;
   a first optical detector for receiving light reflected from the first mirror;
   a second mirror having a second actuator for adjusting a position of the second mirror in a path of a second optical beam;
   a second optical detector for receiving light reflected from the second mirror;
   an interferometer for measuring an interference between the first and second optical beams; and
   a third optical detector for receiving light from a second interfered optical beam;
   wherein at least one of the first actuator and the second actuator is actuated based on an output signal from the first optical detector or the second optical detector, and wherein a first intensity of a first interfered optical beam is increased by the interference, and a second intensity of the second interfered optical beam is decreased by the interference.

2. The optical system of claim 1, further comprising an optical fiber for receiving the first interfered optical beam.

3. The optical system of claim 1 wherein the interference is measured at a beamsplitter.

4. The optical system of claim 1 wherein at least one of the first actuator and the second actuator is actuated based on an output signal from the third optical detector.

5. The optical system of claim 1 wherein:
   the first actuator adjusts the position of the first mirror through a first tip, a first tilt, and a piston; and
   the second actuator adjusts the position of the second mirror through a second tip and a second tilt.

6. The optical system of claim 1, further comprising a controller for controlling the second actuator at least in part based on signals from the second detector and the third detector.

7. The optical system of claim 1 wherein the first and second optical detectors are position-sensitive detectors.

8. The optical system of claim 7 wherein the position-sensitive detectors are quad detectors.

9. The optical system of claim 1, further comprising:
   a beamsplitter for directing at least a portion of the first beam to the first optical detector and at least a portion of the second beam to the second optical detector.

10. A method for coherently combining optical beams, comprising:
    receiving a first optical beam at least in part at a first optical detector;
    receiving a second optical beam at least in part at a second optical detector, wherein the second optical beam is coherent with the first optical beam;
    causing interference between the first optical beam and the second optical beam by intersecting the first and the second optical beams at a beamsplitter;
    receiving a second interfered optical beam at least in part at a third optical detector;
    adjusting a position of the first mirror using a first actuator, wherein the first mirror is in a path of the first optical beam;
    adjusting a position of the second mirror using a second actuator, wherein the second mirror is in a path of the second optical beam; and
    receiving a first interfered optical beam at least in part by an optical fiber, wherein a first intensity of the first interfered optical beam is increased by the interference, and a second intensity of the second interfered optical beam is decreased by the interference.

11. The method of claim 10 wherein adjusting the position of the first mirror and adjusting the position of the second mirror are based at least in part on outputs from the first optical detector and the second optical detector.

12. The method of claim 11 wherein adjusting the positions of the first mirror and adjusting the position of the second mirror are based at least in part on an output from the third optical detector.

13. The method of claim 11 wherein:
    adjusting the position of the first mirror consists of adjusting a tip and a tilt of the first mirror, and
    adjusting the position of the second mirror consists of adjusting a tip, a tilt and a piston of the second mirror.

14. The method of claim 10 wherein the first optical beam is directed to the optical fiber through a focusing lens.

15. The method of claim 10 wherein the first, the second and the third optical detectors are position-sensitive detectors.

16. The method of claim 15 wherein the position-sensitive detectors are quad detectors.

* * * * *